(12) United States Patent
Shimodaira

(10) Patent No.: US 12,109,702 B2
(45) Date of Patent: Oct. 8, 2024

(54) METHOD OF ADJUSTING FORCE CONTROL PARAMETER, ROBOT SYSTEM, AND FORCE CONTROL PARAMETER ADJUSTMENT PROGRAM

(71) Applicant: Seiko Epson Corporation, Tokyo (JP)

(72) Inventor: Yasuhiro Shimodaira, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 263 days.

(21) Appl. No.: 17/472,779

(22) Filed: Sep. 13, 2021

(65) Prior Publication Data

US 2022/0080587 A1 Mar. 17, 2022

(30) Foreign Application Priority Data

Sep. 14, 2020 (JP) ................................. 2020-153567

(51) Int. Cl.
*B25J 9/16* (2006.01)
*G05B 19/4155* (2006.01)

(52) U.S. Cl.
CPC ............ *B25J 9/163* (2013.01); *B25J 9/1612* (2013.01); *B25J 9/1633* (2013.01); *G05B 19/4155* (2013.01); *G05B 2219/40269* (2013.01)

(58) Field of Classification Search
CPC ........ B25J 9/163; B25J 9/1612; B25J 9/1633; B25J 9/1687; B25J 9/1602; B25J 9/1664; G05B 19/4155; G05B 2219/40269; G05B 2219/40032; G05B 2219/39322
See application file for complete search history.

(56) References Cited

U.S. PATENT DOCUMENTS

| 2007/0210740 | A1* | 9/2007 | Sato ....................... B25J 9/1633 318/646 |
| 2014/0188281 | A1 | 7/2014 | Nagai et al. |
| 2016/0089789 | A1* | 3/2016 | Sato ....................... B25J 13/088 700/254 |
| 2018/0021950 | A1* | 1/2018 | Shimodaira .............. B25J 13/02 318/568.11 |

(Continued)

FOREIGN PATENT DOCUMENTS

| JP | 2014-233814 A | 12/2014 |
| JP | 2019-188545 A | 10/2019 |
| JP | 2019-188555 A | 10/2019 |

*Primary Examiner* — Adam R Mott
*Assistant Examiner* — Elizabeth Rose Neleski
(74) *Attorney, Agent, or Firm* — Harness, Dickey & Pierce, P.L.C.

(57) ABSTRACT

A first step of executing a first operation to bring a hand placed on a robot arm or a first object held by the hand into contact with a second object based on a first force control parameter, a second step of acquiring information of an external force applied to the robot arm by executing a second operation different from the first operation on a robot with the hand or the first object in contact with the second object, a third step of acquiring information of external rigidity based on the acquired external force information, and a fourth step of changing the force control parameter from the first force control parameter to a second force control parameter acquired based on the acquired external rigidity information and a position of a control point corresponding to the acquired external rigidity information are provided.

9 Claims, 12 Drawing Sheets

(56) References Cited

U.S. PATENT DOCUMENTS

| | | | |
|---|---|---|---|
| 2018/0029234 A1* | 2/2018 | Ueda | B25J 9/1633 |
| 2018/0111266 A1* | 4/2018 | Okada | B25J 9/1682 |
| 2018/0200893 A1* | 7/2018 | Taguchi | B25J 9/1633 |
| 2019/0329404 A1 | 10/2019 | Takeuchi | |
| 2019/0329415 A1* | 10/2019 | Takeuchi | B25J 9/1633 |

* cited by examiner

FIG. 6
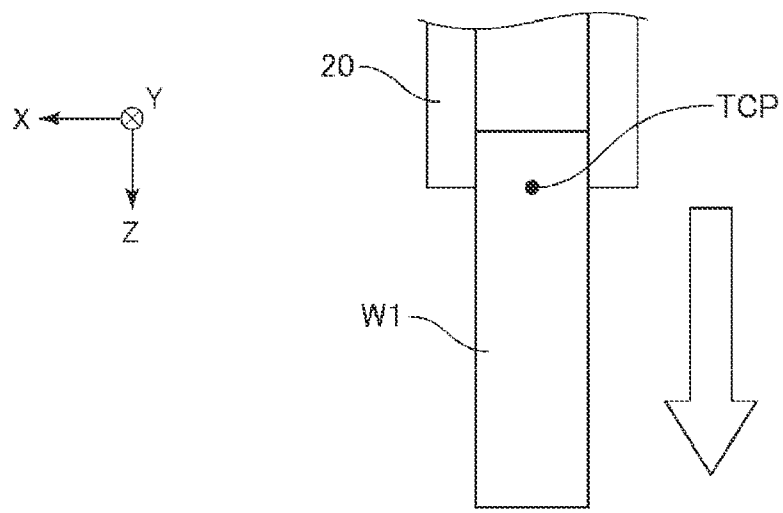
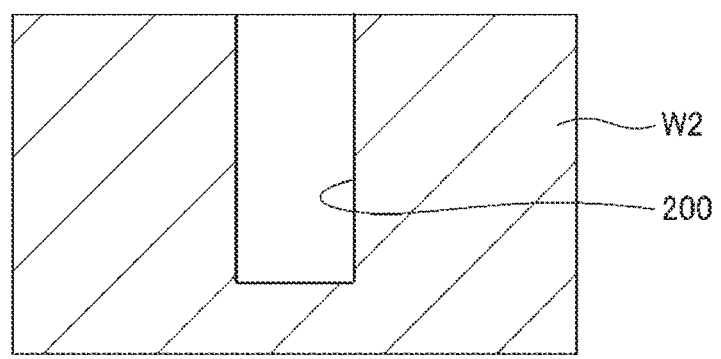

METHOD OF ADJUSTING FORCE CONTROL PARAMETER, ROBOT SYSTEM, AND FORCE CONTROL PARAMETER ADJUSTMENT PROGRAM

The present application is based on, and claims priority from JP Application Serial Number 2020-153567, filed Sep. 14, 2020, the disclosure of which is hereby incorporated by reference herein in its entirety.

BACKGROUND

1. Technical Field

The present disclosure relates to a method of adjusting force control parameters, a robot system, and force control parameters adjustment program.

2. Related Art

A robot having a robot arm and a force detection unit that detects a force applied to the robot arm and performing predetermined work by force control to drive the robot arm based on a detection result of the force detection unit is known. In the robot, for example, as disclosed in JP-A-2014-233814, for the force control, it is necessary to determine a mode in which the robot arm is driven and set force control parameters to a suitable value.

However, the suitable force control parameter changes depending on details of work, characteristics of the robot arm itself, surrounding environments, or the like. It is difficult to set the suitable force control parameter in consideration thereof.

SUMMARY

A method of adjusting force control parameters of a robot having a robot arm driven by force control and performing work to insert a first object into a second object according to an aspect of the present disclosure includes a first step of executing a first operation to bring a hand placed on the robot arm or the first object held by the hand into contact with the second object based on a first force control parameter, a second step of acquiring information of an external force applied to the robot arm by executing a second operation different from the first operation on the robot with the hand or the first object in contact with the second object, a third step of acquiring information of external rigidity based on the acquired external force information, and a fourth step of changing the force control parameter from the first force control parameter to a second force control parameter acquired based on the acquired external rigidity information and a position of a control point corresponding to the acquired external rigidity information.

A robot system according to an aspect of the present disclosure includes a robot having a robot arm driven by force control and performing work, a force detection unit detecting a force applied to the robot arm, and a control unit controlling actuation of the robot, wherein the control unit executes a first operation to bring a hand placed on the robot arm or a first object held by the hand into contact with a second object based on a first force control parameter, acquires information of an external force applied to the robot arm by executing a second operation different from the first operation on the robot with the hand or the first object in contact with the second object, acquires information of external rigidity based on the acquired external force information, and performs control to set a second force control parameter acquired based on the acquired external rigidity information and a position of a control point corresponding to the acquired external rigidity information as the force control parameter.

A non-transitory computer-readable storage medium storing a force control parameter adjustment program for adjusting force control parameters of a robot having a robot arm driven by force control and performing work to insert a first object into a second object according to an aspect of the present disclosure causes a computer to perform the steps of a first step of executing a first operation to bring a hand placed on the robot arm or the first object held by the hand into contact with the second object based on a first force control parameter, a second step of acquiring information of an external force applied to the robot arm by executing a second operation different from the first operation on the robot with the hand or the first object in contact with the second object, a third step of acquiring information of external rigidity based on the acquired external force information, and a fourth step of setting a second force control parameter acquired based on the acquired external rigidity information and a position of a control point corresponding to the acquired external rigidity information as the force control parameter.

BRIEF DESCRIPTION OF THE DRAWINGS

FIG. 6 is a longitudinal sectional view for explanation of a first operation.

DESCRIPTION OF EXEMPLARY EMBODIMENTS

Embodiment

Figure 1:
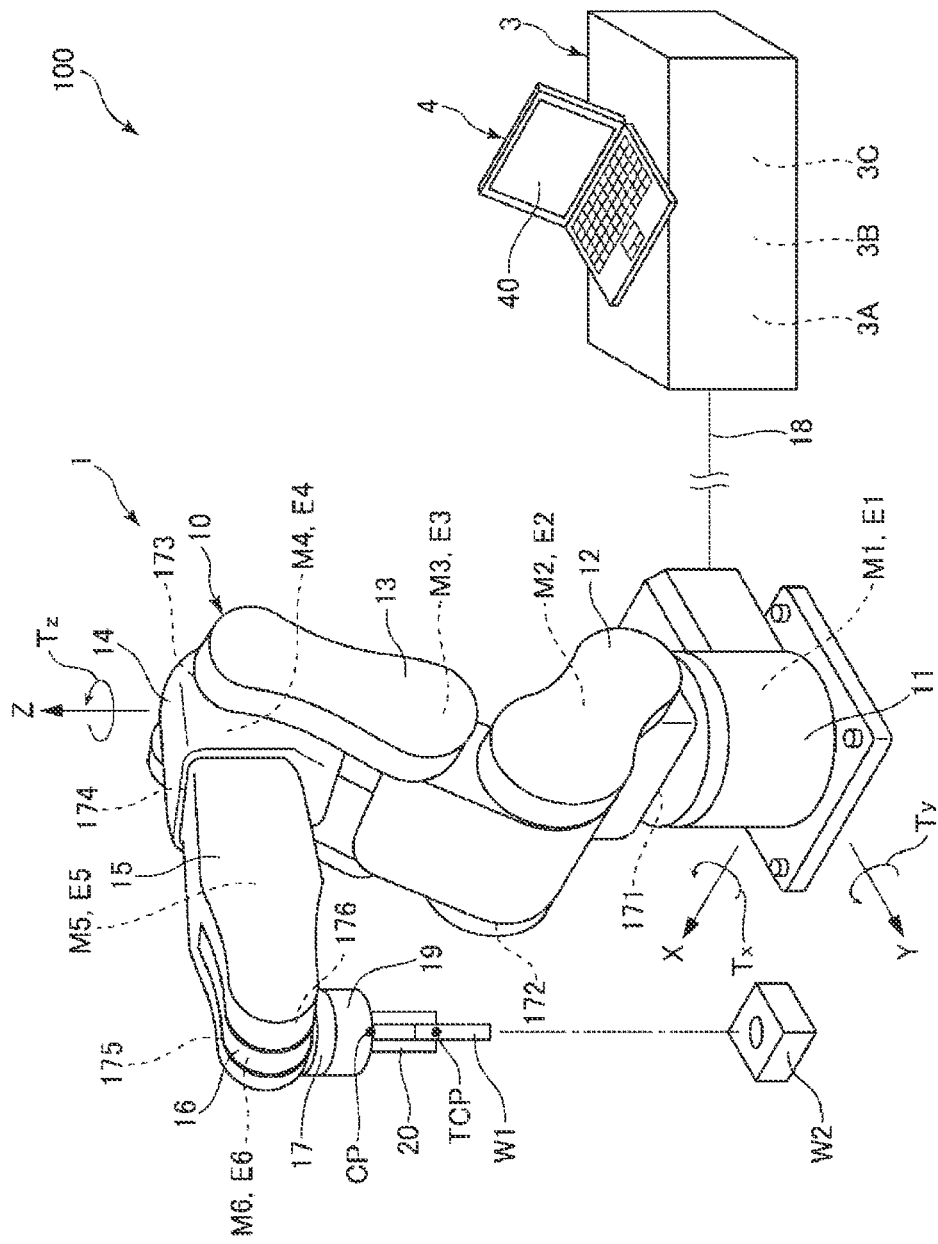
FIG. 1 shows an overall configuration of a robot system.
Figure 2:
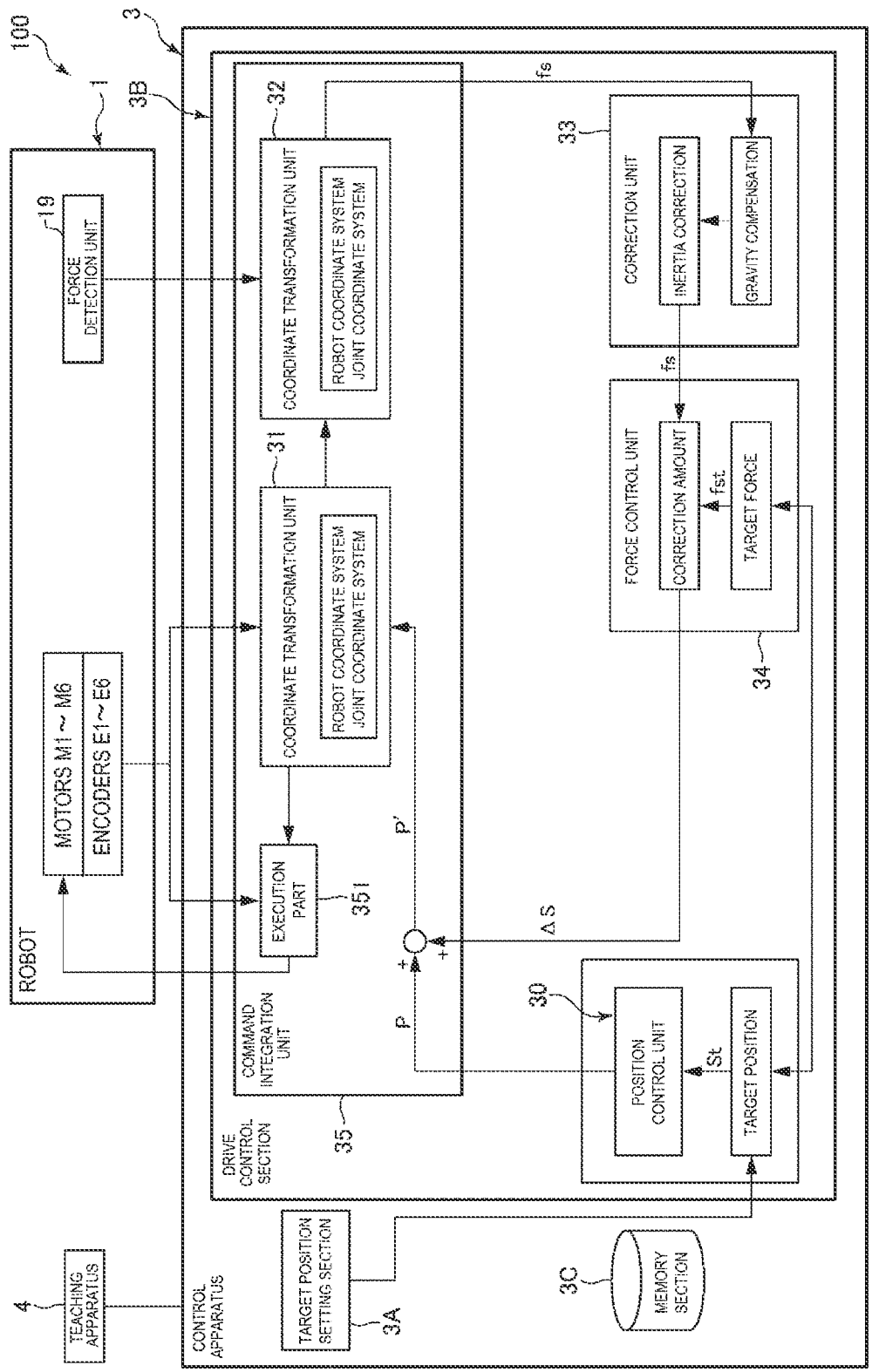
FIG. 2 is a block diagram of the robot system shown in FIG. 1.
Figure 3:
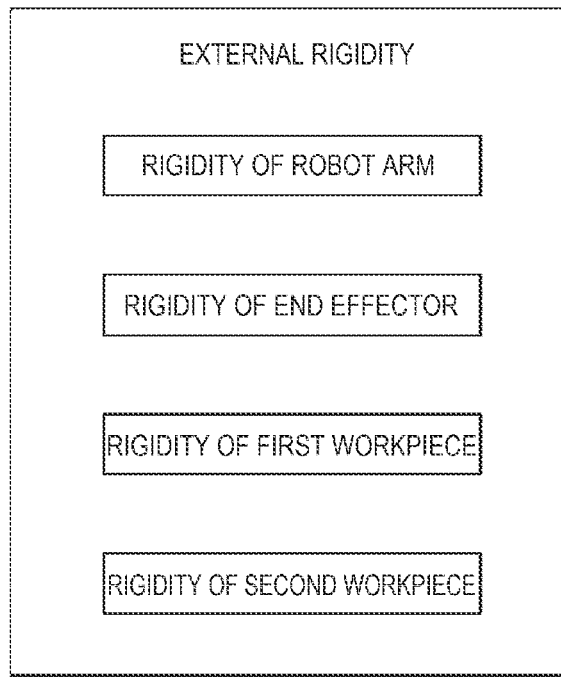
FIG. 3 is a conceptual diagram for explanation of external rigidity.
Figure 4:
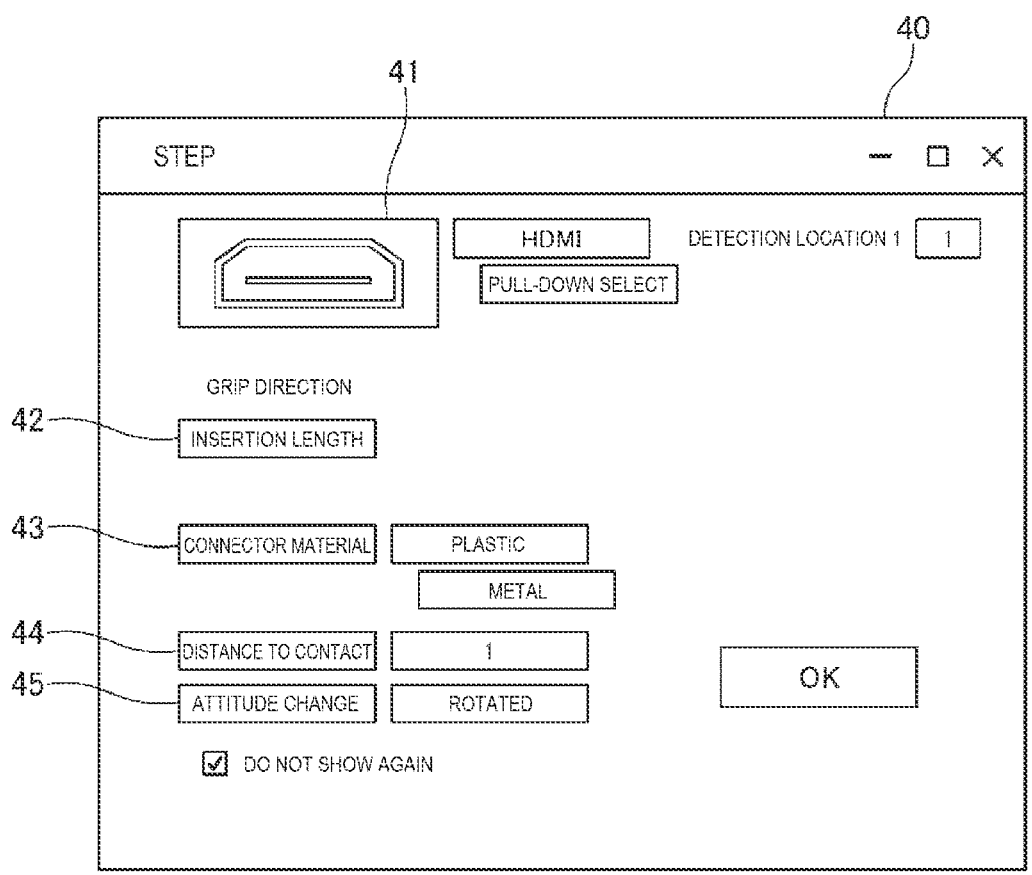
FIG. 4 is a plan view showing an example of an input window.
Figure 5:
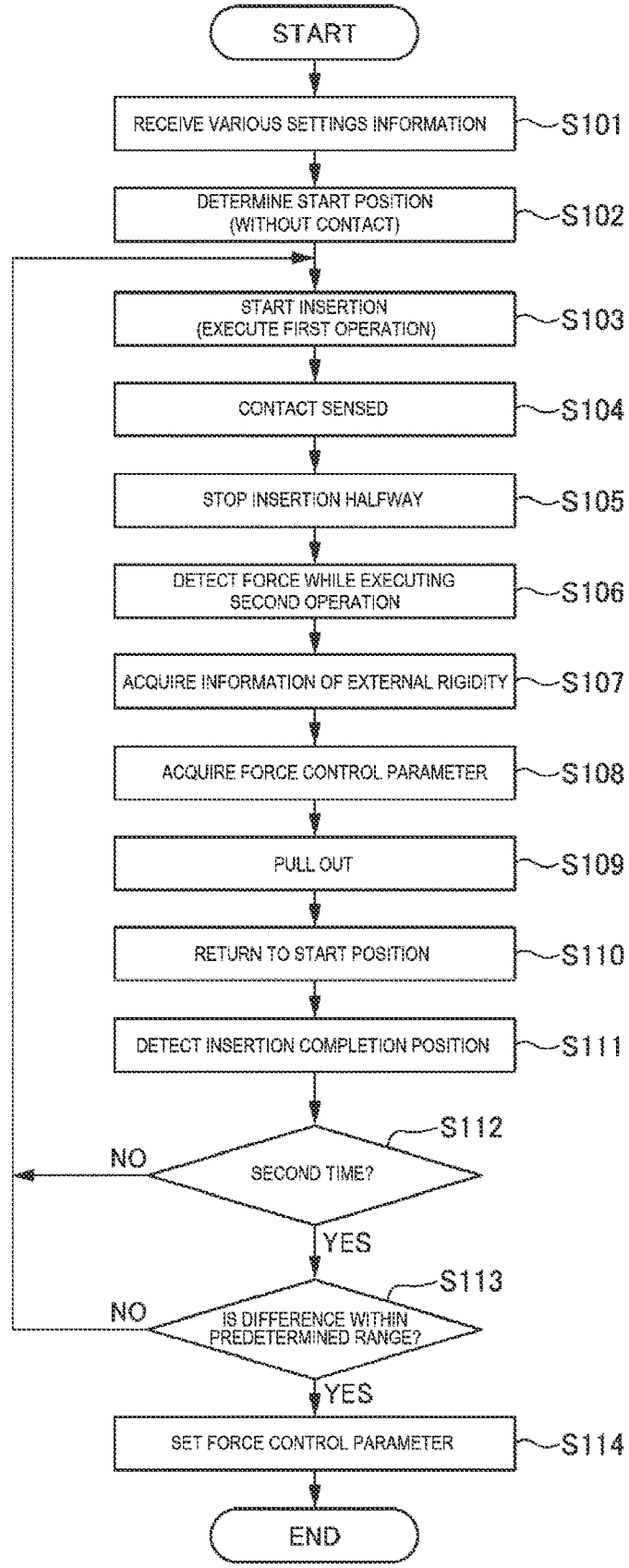
FIG. 5 is a flowchart for explanation of a control operation executed by the robot system shown in FIG. 1.
Figure 7:
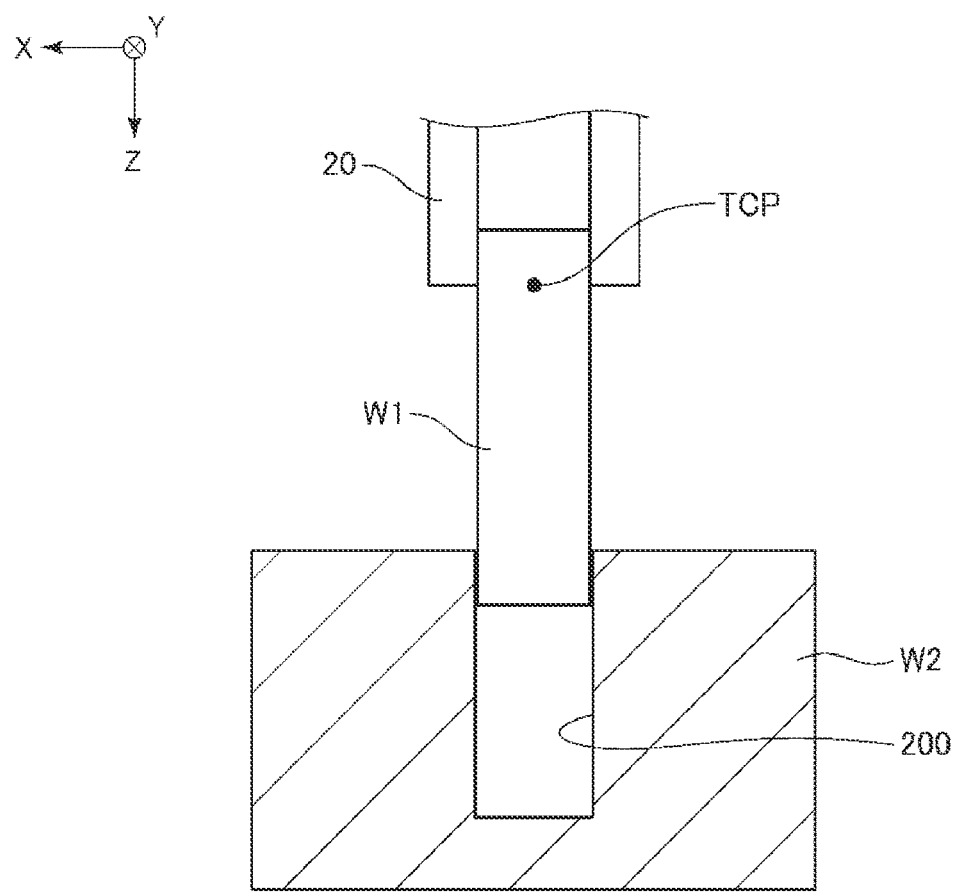
FIG. 7 is a longitudinal sectional view for explanation of the first operation.
Figure 8:
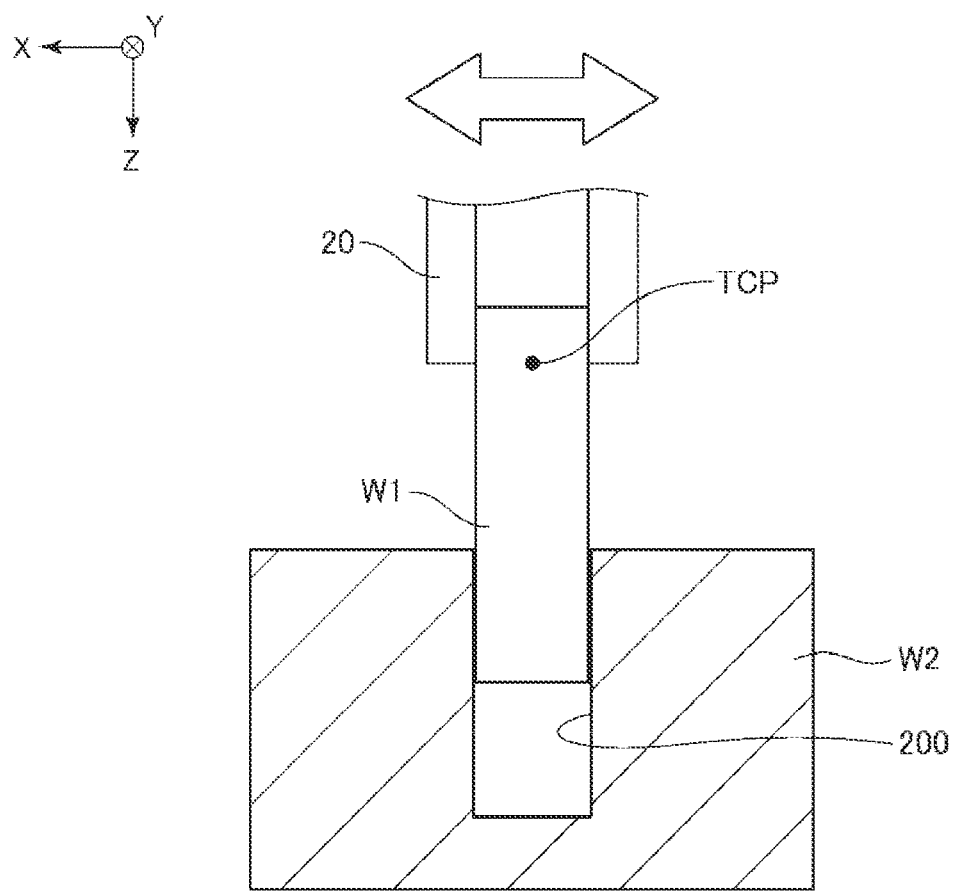
FIG. 8 is a longitudinal sectional view for explanation of a second operation.
Figure 9:
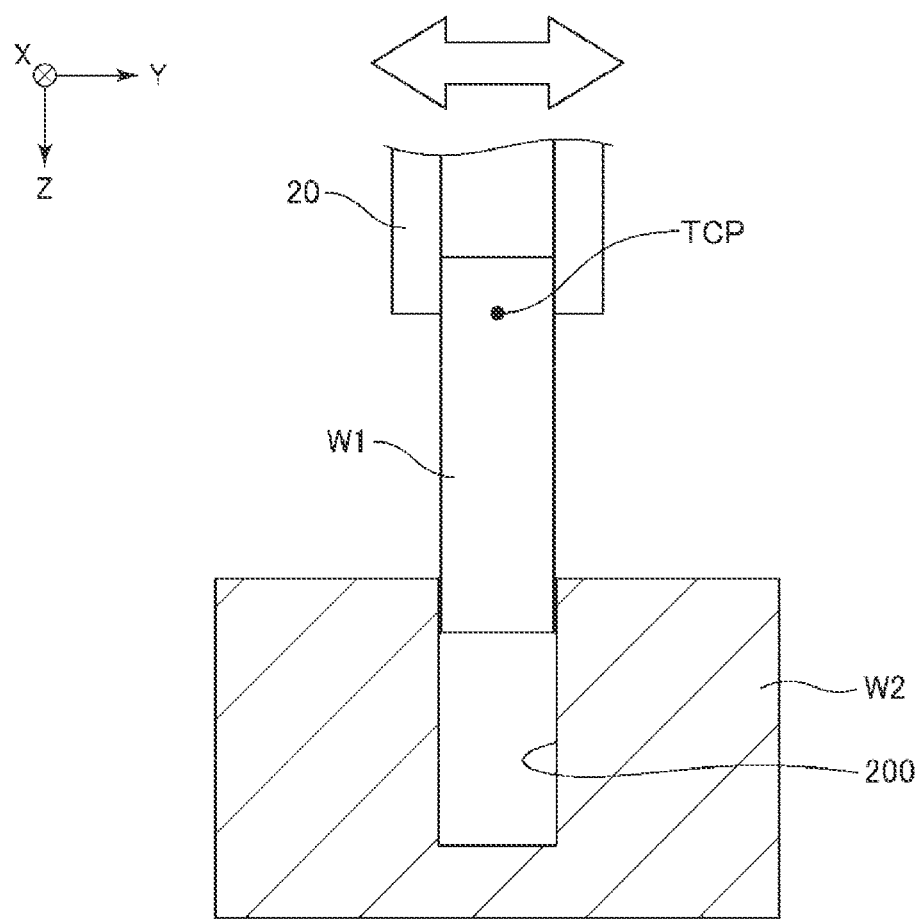
FIG. 9 is a longitudinal sectional view for explanation of the second operation.
Figure 10:
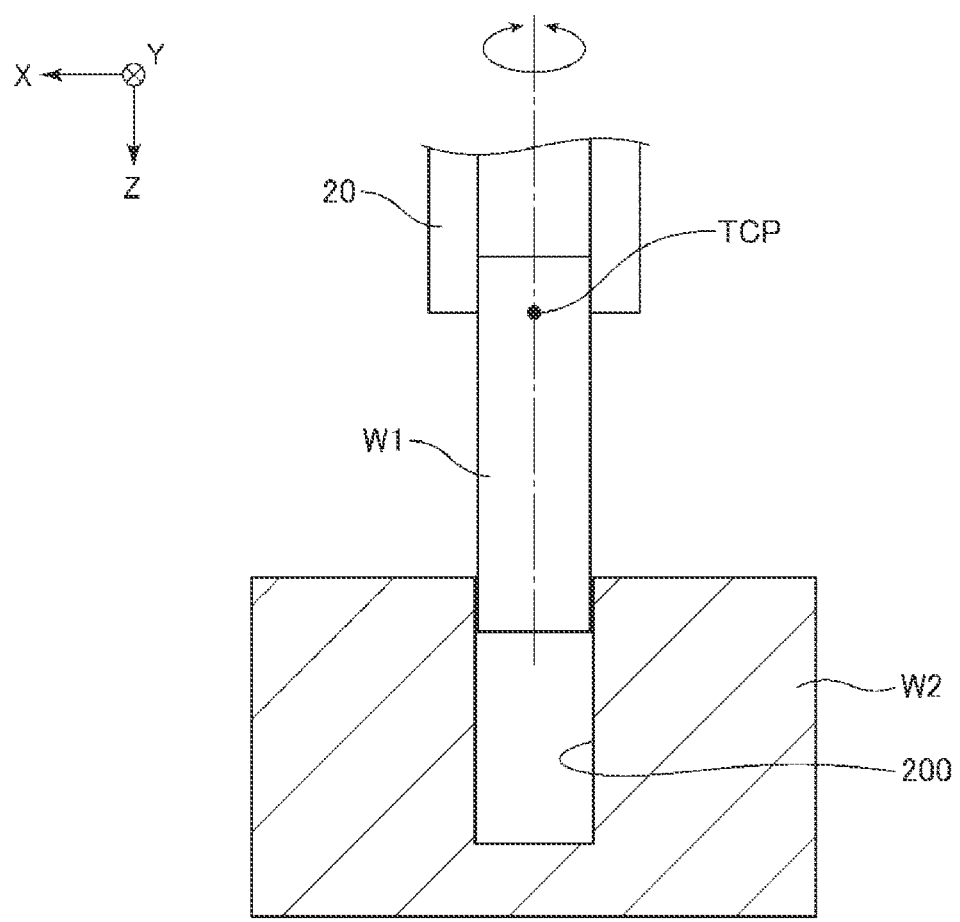
FIG. 10 is a longitudinal sectional view for explanation of the second operation.
Figure 11:
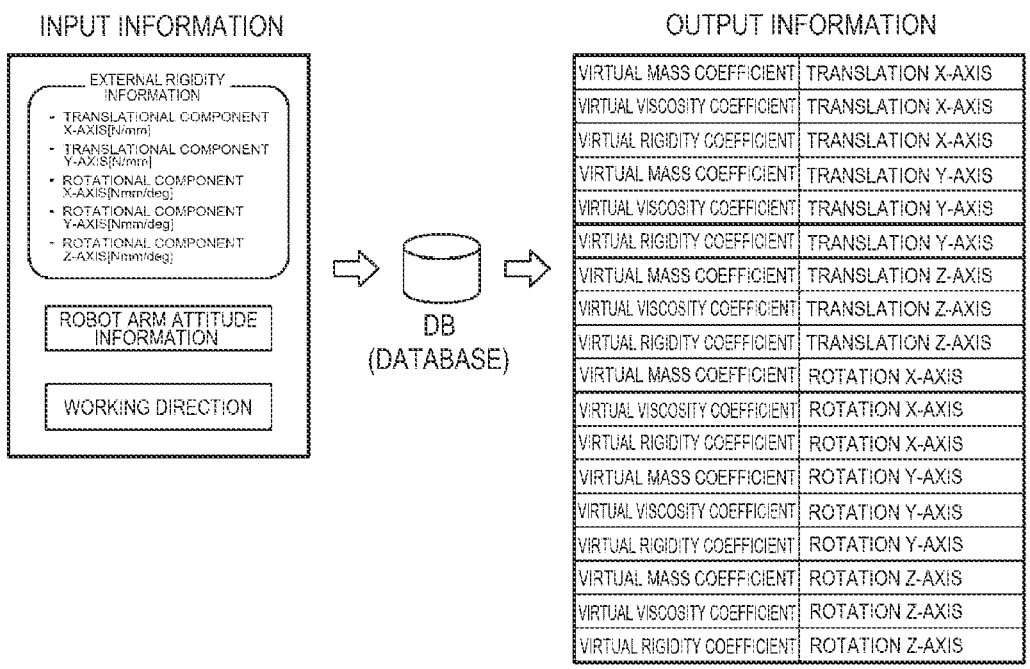
FIG. 11 is a conceptual diagram for explanation of a method of acquiring force control parameters.

FIG. 1 shows an overall configuration of a robot system. FIG. 2 is a block diagram of the robot system shown in FIG. 1. FIG. 3 is a conceptual diagram for explanation of external rigidity. FIG. 4 is a plan view showing an example of an input window. FIG. 5 is a flowchart for explanation of a control operation executed by the robot system shown in FIG. 1. FIGS. 6 and 7 are longitudinal sectional views for explanation of a first operation. FIGS. 8 to 10 are longitudinal sectional views for explanation of a second operation. FIG. 11 is a conceptual diagram for explanation of a method of acquiring force control parameters.

As below, a method of adjusting force control parameters, a robot system, and force control parameters adjustment program according to the present disclosure will be explained in detail based on preferred embodiments shown in the accompanying drawings. Hereinafter, for convenience of explanation, a +Z-axis direction, i.e., the upside in FIG. 1 is also referred to as "upper" and a −Z-axis direction, i.e., the downside is also referred to as "lower". Further, regarding a robot arm, a base 11 side in FIG. 1 is also referred to as "proximal end" and the opposite side, i.e., an end effector side is also referred to as "distal end". Furthermore, the Z-axis directions, i.e., the upward and downward directions in FIG. 1 are referred to as "vertical directions" and X-axis directions and Y-axis directions, i.e., the leftward and rightward directions are referred to as "horizontal directions".

As shown in FIG. 1, a robot system 100 includes a robot 1, a control apparatus 3 that controls the robot 1, and a teaching apparatus 4, and executes a method of adjusting force control parameters according to the present disclosure.

First, the robot 1 is explained.

The robot 1 shown in FIG. 1 is a single-arm six-axis vertical articulated robot in the embodiment, and has a base 11 and a robot arm 10. Further, an end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that supports the robot arm 10 from the downside so that the robot arm can be driven and fixed to e.g. a floor within a factory. In the robot 1, the base 11 is electrically coupled to the control apparatus 3 via a relay cable 18. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including the entire lengths of the respective arms are not particularly limited, but can be appropriately set.

The base 11 and the first arm 12 are coupled via a joint 171. Further, the first arm 12 is pivotable about a first pivot axis parallel to the vertical directions as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal directions as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal directions as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drive units and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the joint 175 and detects the position of the motor M5. The encoder E6 is provided inside of the joint 176 and detects the position of the motor M6.

The encoder E1 to encoder E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor drivers (not shown) based on the information. That is, to control the robot arm 10 is to control the motor M1 to motor M6.

A control point CP is set at the distal end of the robot arm 10. The control point CP is a point as a reference for control of the robot arm 10. In the robot system 100, the position of the control point CP is acquired in a robot coordinate system and the robot arm 10 is driven to move the control point CP to a desired position.

Further, in the robot 1, a force detection unit 19 that detects a force is detachably placed in the robot arm 10. The robot arm 10 may be driven with the force detection unit 19 placed therein. The force detection unit 19 is a six-axis force sensor in the embodiment. The force detection unit 19 detects magnitude of forces on three detection axes orthogonal to one another and magnitude of torque about the three detection axes. That is, the force detection unit 19 detects force components in the respective axial directions of the X-axis, the Y-axis, Z-axis orthogonal to one another, a force component in a Tx direction about the X-axis, a force component in a Ty direction about the Y-axis, and a force component in a Tz direction about the Z-axis. Note that, in the embodiment, the Z-axis directions are the vertical directions. The force components in the respective axial directions may be referred to as "translational force components" and the force components about the respective axes may be referred to as "torque components". The force detection unit 19 is not limited to the six-axis force sensor, but may have another configuration.

In the embodiment, the force detection unit 19 is placed in the sixth arm 17. Note that the placement position of the force detection unit 19 is not limited to the sixth arm 17, i.e., the arm located at the most distal end side, but may be in the other arm, between the adjacent arms, or in a lower part of the base 11, for example.

The end effector 20 may be detachably attached to the force detection unit 19. The end effector 20 includes a hand gripping an object by moving a pair of claws closer to or away from each other. The present disclosure is not limited to that, but two or more claws may be provided. Or, a hand gripping an object by adsorption may be employed.

Further, in the robot coordinate system, a tool center point TCP is set in an arbitrary position at the distal end of the end effector 20, preferably, at the distal end at which the respective claws are close to each other. As described above, in the robot system 100, the position of the control point CP is acquired in the robot coordinate system and the robot arm 10 is driven to move the control point CP to a desired position. The type, particularly, the length of the end effector 20 is acquired, and thereby, an offset amount between the tool center point TCP and the control point CP may be acquired. Accordingly, the position of the tool center point TCP may be acquired in the robot coordinate system. Therefore, the tool center point TCP may be used as a reference for the control.

As shown in FIG. 1, the robot 1 performs work to grip, insert, and fits a workpiece W1 as a first object into a workpiece W2 as a second object. Here, "fit" is used as not only "fit" in the narrow sense, but used in the broad sense including "fit in" and "engage". Therefore, depending on the configurations of the workpiece W1 and the workpiece W2, "fit" may be read to "fit in", "engage", or the like. Note that the work may be work to grip the workpiece W2 and insert the workpiece W1 into the workpiece W2.

The workpiece W1 is a rod-shape member having a circular cross-sectional shape. Note that the workpiece W1 may have a cross-sectional shape in a polygonal shape such as a triangular shape, a quadrangular shape, or a shape with more vertices, or a star shape. The workpiece W2 has a block shape having an insertion hole 200 in which the workpiece W1 is inserted.

Next, the control apparatus 3 and the teaching apparatus 4 will be explained.

The control apparatus 3 is placed apart from the robot 1 and includes a computer having a CPU (Central Processing Unit) as an example of a processor provided therein. The control apparatus 3 may be provided inside of the base 11 of the robot 1.

The control apparatus 3 is communicably coupled to the robot 1 by the relay cable 18. The control apparatus is coupled to the teaching apparatus 4 by a cable or communicably coupled in wireless connection. The teaching apparatus 4 may be a dedicated computer or a general-purpose computer in which programs for teaching the robot 1 are installed. For example, a teaching pendant or the like as a dedicated device for teaching the robot 1 may be used in place of the teaching apparatus 4. Or, the control apparatus 3 and the teaching apparatus 4 may have separate housings or may be integrally formed.

In the teaching apparatus 4, a program for generating an execution program having a target position and attitude $S_t$ and a target force $f_{St}$, which will be described later, as parameters in the control apparatus 3 and loading the execution program in the control apparatus 3 may be installed. The teaching apparatus 4 includes a display, a processor, a RAM, and a ROM, and these hardware resources generate the execution program in cooperation with a teaching program.

As shown in FIG. 2, the control apparatus 3 is a computer in which a control program for control of the robot is installed. The control apparatus 3 includes a processor and a RAM and a ROM (not shown), and these hardware resources control the robot 1 in cooperation with the program.

Further, as shown in FIG. 2, the control apparatus 3 has a target position setting section 3A, a drive control section 3B, and a memory section 3C. The memory section 3C includes e.g. a volatile memory such as a RAM (Random Access Memory), a nonvolatile memory such as a ROM (Read Only Memory), and a detachable external memory device. In the memory section 3C, operation programs for actuation of the robot 1 including programs for execution of the method of adjusting the force control parameter according to the present disclosure are stored.

The target position setting section 3A sets the target position and attitude $S_t$ and a motion route for execution of predetermined work on the workpiece W1. The target position setting section 3A sets the target position and attitude $S_t$ and the motion route based on teaching information input from the teaching apparatus 4 or the like.

The drive control section 3B controls driving of the robot arm 10 and has a position control unit 30, a coordinate transformation unit 31, a coordinate transformation unit 32, a correction unit 33, a force control unit 34, and a command integration unit 35.

The position control unit 30 generates a position command signal, i.e., a position command value for controlling the position of the tool center point TCP of the robot 1 according to a target position designated by a command created in advance.

Here, the control apparatus 3 can control motion of the robot 1 by force control or the like. "Force control" refers to control of the motion of the robot 1 to change the position of the end effector 20, i.e., the position of the tool center point TCP and the attitudes of the first arm 12 to sixth arm 17 based on the detection result of the force detection unit 19.

The force control includes e.g. force trigger control and impedance control. In the force trigger control, force detection is performed by the force detection unit 19, and the robot arm 10 is moved and changed in attitude until a predetermined force is detected by the force detection unit 19.

The impedance control includes profile control. First, in brief explanation, in the impedance control, the motion of the robot arm 10 is controlled so that the force applied to the distal end portion of the robot arm 10 may be maintained as equal to the predetermined force as possible, that is, a force in a predetermined direction detected by the force detection unit 19 may be maintained as equal to the target force $f_{St}$ as possible. Thereby, for example, when the impedance control is performed on the robot arm 10, the robot arm 10 performs profiling motion for an external force applied by an object or an operator with respect to the predetermined direction. Note that the target force $f_{St}$ includes zero. For example, as one of settings in a case of the profiling motion, the target value may be set to "0". The target force $f_{St}$ may be set to another numerical value than zero. The target force $f_{St}$ can be appropriately set by the worker.

The memory section 3C stores correspondence relationships between combinations of the rotation angles of the motor M1 to motor M6 and the positions of the tool center point TCP in the robot coordinate system. Further, the control apparatus 3 stores at least one of the target position and attitude $S_t$ and the target force $f_{St}$ for each step of the work performed by the robot 1 according to the command in the memory section 3C. The command having the target position and attitude $S_t$ and the target force $f_{St}$ as parameters is set for each step of the work performed by the robot 1.

The drive control section 3B controls the first arm 12 to sixth arm 17 so that the set target position and attitude $S_t$ and target force $f_{St}$ may coincide at the tool center point TCP. The target force $f_{St}$ is a detection force and torque of the force detection unit 19 to be achieved by the motion of the first arm 12 to sixth arm 17. Here, the character "S" expresses one direction of directions of the axes (X, Y, Z) defining the robot coordinate system. Further, "S" also expresses a position in an S direction. For example, when S=X, an X direction component of the target position set in the robot coordinate system is $S_t=X_t$, and an X direction component of the target force is $f_{St}=f_{Xt}$.

In the drive control section 3B, when the rotation angles of the motor M1 to motor M6 are acquired, the coordinate transformation unit 31 shown in FIG. 2 transforms the rotation angles into the position and attitude S (X, Y, Z, Tx, Ty, Tz) of the tool center point TCP in the robot coordinate system based on the correspondence relationships. Then, the coordinate transformation unit 32 specifies an acting force $f_S$ actually acting on the force detection unit 19 in the robot coordinate system based on the position and attitude S of the tool center point TCP and the detection value of the force detection unit 19.

The point of application of the acting force $f_S$ is defined as a force detection origin separate from the tool center point TCP. The force detection origin corresponds to a point at which the force detection unit 19 detects a force. Note that the control apparatus 3 stores a correspondence relationship defining directions of detection axes in a sensor coordinate system of the force detection unit 19 with respect to each position and attitude S of the tool center point TCP in the robot coordinate system. Therefore, the control apparatus 3 may specify the acting force $f_S$ in the robot coordinate system based on the position and attitude S of the tool center point TCP in the robot coordinate system and the correspondence relationship. Further, torque acting on the robot may be calculated from the acting force $f_S$ and a distance from a contact point to the force detection unit 19 and is specified as a torque component. Note that, when the end effector 20 performs work in contact with the workpiece W1, the contact point may be regarded as the tool center point TCP.

The correction unit 33 performs gravity compensation on the acting force $f_S$. The gravity compensation refers to removal of components of a force and torque caused by the gravity force from the acting force $f_S$. The gravity-compensated acting force $f_S$ may be regarded as another force than the gravity force acting on the robot arm 10 or the end effector 20.

Further, the correction unit 33 performs inertia compensation on the acting force $f_S$. The inertia compensation refers to removal of components of a force and torque caused by the inertial force from the acting force $f_S$. The inertia-compensated acting force $f_S$ may be regarded as another force than the inertial force acting on the robot arm 10 or the end effector 20.

The force control unit 34 performs impedance control. The impedance control is active impedance control that realizes virtual mechanical impedance using the motor M1 to motor M6. The control apparatus 3 executes the impedance control in processes under contact conditions in which forces are applied to the end effector 20 from workpieces as objects including fitting work, screwing work, polishing work of the workpieces and for direct teaching. Even in another case than the above described processes, for example, the impedance control is performed when a human contacts the robot 1, and thereby, safety may be increased.

In the impedance control, the target force $f_{St}$ is substituted into the equation of motion, which will be described later, and the rotation angles of the motor M1 to motor M6 are derived. The signals for controlling the motor M1 to motor M6 by the control apparatus 3 are PWM (Pulse Width Modulation)-modulated signals.

In a non-contact process in which no external force is applied to the end effector 20, the control apparatus 3 controls the motor M1 to motor M6 at the rotation angles derived by linear calculation from the target position and attitudes $S_t$. A mode in which the motor M1 to motor M6 are controlled at the rotation angles derived by linear calculation from the target position and attitudes $S_t$ is referred to as "position control mode".

The control apparatus 3 specifies a force-derived correction amount ΔS by substitution of the target force $f_{St}$ and the acting force $f_S$ into the equation of motion of the impedance control. The force-derived correction amount ΔS refers to magnitude of the position and attitude S to which the tool center point TCP should move to resolve a force deviation $\Delta f_S(t)$ from the target force $f_{St}$ when the tool center point TCP is subjected to mechanical impedance. The following Equation (1) is the equation of motion of the impedance control.

$$m\Delta\ddot{S}(t)+d\Delta\dot{S}(t)+k\Delta S(t)=\Delta f_S(t) \qquad (1)$$

The left side of Equation (1) is formed by the first term in which the second-order differential value of the position and attitude S of the tool center point TCP is multiplied by a virtual mass coefficient m (hereinafter, referred to as "mass coefficient m"), the second term in which the differential value of the position and attitude S of the tool center point TCP is multiplied by a virtual viscosity coefficient d (hereinafter, referred to as "viscosity coefficient d"), and the third term in which the position and attitude S of the tool center point TCP is multiplied by a virtual elastic coefficient k (hereinafter, referred to as "elastic coefficient k"). The right side of Equation (1) is formed by the force deviation $\Delta f_S(t)$ obtained by subtraction of the real force f from the target force $f_{St}$. The differential in Equation (1) refers to time differential. In a process performed by the robot 1, a constant value may be set as the target force $f_{St}$ or a time function may be set as the target force $f_{St}$.

The mass coefficient m refers to a mass that the tool center point TCP virtually has, the viscosity coefficient d refers to a viscous resistance to which the tool center point TCP is virtually subjected, and the elastic coefficient k refers to a spring constant of an elastic force to which the tool center point TCP is virtually subjected.

The larger the value of the mass coefficient m, the lower the acceleration of the motion, and the smaller the value of the mass coefficient m, the higher the acceleration of the motion. The larger the value of the viscosity coefficient d, the lower the velocity of the motion, and the smaller the value of the viscosity coefficient d, the higher the velocity of the motion. The larger the value of the elastic coefficient k, the higher the spring property, and the smaller the value of the elastic coefficient k, the lower the spring property.

In this specification, the respective mass coefficient m, viscosity coefficient d, and elastic coefficient k are referred to as "force control parameters". These mass coefficient m, viscosity coefficient d, and elastic coefficient k may be set to different values with respect to each direction or set to common values regardless of the directions. Further, the mass coefficient m, the viscosity coefficient d, and the elastic coefficient k can be appropriately set by the worker before work. This will be described later in detail.

As described above, in the robot system 100, the correction amount is obtained from the detection value of the force detection unit 19, the preset force control parameters, and the preset target force. The correction amount refers to the above described force-derived correction amount $\Delta S$ and a difference between the position in which the external force is applied and the position to which the tool center point TCP should be moved.

Then, the command integration unit 35 adds the force-derived correction amount $\Delta S$ to the position command value P generated by the position control unit 30. The addition is performed as necessary, and thereby, the command integration unit 35 obtains a new position command value P' from the position command value P used for movement to the position in which the external force is applied.

Then, the coordinate transformation unit 31 transforms the new position command value P' into the robot coordinates and an execution part 351 executes, and thereby, the tool center point TCP is moved to the position in consideration of the force-derived correction amount $\Delta S$ and the impact by the application of the external force may be relaxed and the more load applied to the object in contact with the robot 1 may be relaxed.

According to the above described drive control section 3B, the robot arm 10 may be driven with the workpiece W1 gripped to move the tool center point TCP toward the target position and attitude $S_t$ and to move the tool center point TCP until the target force $f_{St}$ becomes a preset value. Specifically, the insertion work is performed until the workpiece W1 is inserted into the insertion hole 200 of the workpiece W2 and the preset target force $f_{St}$ is detected, and thereby, the insertion work may be completed. Further, in the insertion process, the above described force control is performed, and thereby, excessive loads applied to the workpiece W1 and the workpiece W2 may be prevented or suppressed.

Here, it is necessary for the worker to set the above described force control parameters, i.e., the above described mass coefficient m, viscosity coefficient d, and elastic coefficient k to appropriate values before work according to details of the work, types of the workpiece W1 and the workpiece W2, or the like. These coefficients are set to the appropriate values, and thereby, the mode of the robot arm 10 during work may be set in a mode suitable for the work and accurate and prompt work may be performed.

However, the suitable force control parameter changes depending on not only details of work but also characteristics of the robot arm 10 itself, surrounding environments, or the like. It is difficult to set the suitable force control parameter in consideration thereof. Accordingly, in the present disclosure, the worker inputs conditions, which will be described later, tentatively drives the robot arm 10, acquires information of rigidity of the robot arm 10 itself and external rigidity information as information of peripheral rigidity, and adjusts the force control parameter based on the acquired external rigidity information. Thereby, the force control parameter in consideration of the external rigidity may be set.

Note that the external rigidity refers to rigidity of the entire external part as seen from the tool center point TCP. That is, as shown in FIG. 3, the external rigidity refers to entire rigidity in consideration of rigidity of the robot arm 10, rigidity of the end effector 20, rigidity of the workpiece W1, and rigidity of the workpiece W2. The rigidity of each element correlates with an external force applied to the robot arm 10. In other words, the external rigidity is determined by a function of an amount of movement of the tool center point TCP and the external force applied to the robot arm 10, i.e., an external force obtained from the detection value detected by the force detection unit 19. Further, the external rigidity is a real number expressed in a unit of "N/mm" or "Nmm/deg", and the unit is determined according to the type of a second operation, which will be described later.

As described above, the elements determining the external rigidity include information of elements belonging to the robot arm 10, information of the end effector 20 as the hand, information of the workpiece W1 as the first object, and information of the workpiece W2 as the second object. Thereby, the external rigidity information may be accurately acquired. As a result, the force control parameter may be accurately set.

Note that the external rigidity includes rigidity of a workbench (not shown) on which the workpiece W2 is mounted, rigidity of a placement surface on which the robot is placed, etc. in addition to the above described rigidity.

"Acquisition" in this specification refers to reception and storage of information in one of the control apparatus 3, the teaching apparatus 4, and a communicable external memory device.

As below, an example of the method of adjusting the force control parameter according to the present disclosure will be explained using the flowchart shown in FIG. 5. The following respective steps S101 to S112 are shared by the control apparatus 3 and the teaching apparatus 4 in the embodiment, however, the present disclosure is not limited to that. One of the control apparatus 3 and the teaching apparatus 4 may execute the steps.

Step S101 is a step at which the worker inputs using an input window 40 shown in FIG. 4 and the processor of the teaching apparatus 4 executes based on the input. First, the input window 40 is explained. The input window 40 is displayed on the display of the teaching apparatus 4 and the worker may perform various settings by operating the window. Note that the input window 40 may be displayed on another display than that of the teaching apparatus 4.

The input window 40 has a first input portion 41, a second input portion 42, a third input portion 43, a fourth input portion 44, and a fifth input portion 45. The first input portion 41 is for input of information, particularly, a type of the workpiece W1. The second input portion 42 is for selection of a direction in which the workpiece W1 is gripped. Specifically, the second input portion 42 is for input of an insertion length of the workpiece W1 into the workpiece W2. The third input portion 43 is for input of information, particularly, a material of the workpiece W2. The fourth input portion 44 is for input of a distance from an initial position at the start of work to a position in which the workpiece W1 and the workpiece W2 contact. The fifth input portion 45 is for input of whether or not an attitude of the workpiece W1 is changed when the workpiece W1 is inserted.

The first input portion 41 to fifth input portion may have e.g. configurations in which cursors are operated to select and input using a mouse, a keyboard, or the like or touch-panel configurations in which the worker touches desirable positions to select and input.

When the worker performs the above described settings by operating the first input portion 41 to fifth input portion 45, various kinds of settings information is received at step S101.

Then, at step S102, a start position is determined. That is, without contact between the workpiece W1 and the workpiece W2, a position where the robot arm 10 starts force control is determined. This step is determined based on the information set by the worker at step S101.

As shown in FIGS. 6 to 11, an operation to insert the tool center point TCP in the Z-axis direction is explained as an example.

Then, at step S103, insertion is started, that is, the force control is started to move the workpiece W1 closer to the workpiece W2 (see FIG. 6). The force control parameter at this step is a first force control parameter as a preset initial value. The first force control parameter may be set by the worker at step S101 or stored. Note that, to step S105 and at step S108 and step S109, the force control is executed with the first force control parameter.

At this step, the work to insert the workpiece W1 into the workpiece W2 is explained as the example and the robot arm 10 is driven until the workpiece W1 contacts the workpiece W2, however, the present disclosure is not limited to that. Depending on the details of work, the end effector 20 may be driven to contact the workpiece W2.

Then, at step S104, when the contact between the workpiece W1 and the workpiece W2 is sensed based on a detection result of the force detection unit 19, at step S105, the robot arm 10 is stopped in the middle of insertion (see FIG. 7).

These step S103 and step S104 are a first step of executing a first operation to bring the end effector 20 as the hand placed on the robot arm 10 or the workpiece W1 as the first object held by the end effector 20 into contact with the workpiece W2 as the second object based on the first force control parameter.

Then, at step S106, with the contact between the workpiece W1 and the workpiece W2, a force applied to the robot arm 10 is detected while the second operation is executed. That is, the detection result of the force detection unit 19 is acquired while the following second operation is executed.

The second operation includes the operation as shown in FIGS. 8 to 10.

As shown in FIG. 8, the second operation includes an operation to drive the robot arm 10 to move the workpiece W1 in directions crossing directions in which the workpiece W1 is inserted into and pulled out of the workpiece W2, e.g. the X-axis directions within an XY-plane. Thereby, when imperfect alignment occurs during insertion of the workpiece W1, an external force applied to the robot arm 10 may be detected.

Further, as shown in FIG. 9, the second operation includes an operation to drive the robot arm 10 to move the workpiece W1 in directions crossing directions in which the workpiece W1 is inserted into and pulled out of the workpiece W2, e.g. the Y-axis directions within an XY-plane. Thereby, when imperfect alignment occurs during insertion of the workpiece W1, an external force applied to the robot arm 10 may be detected. Note that, in the embodiment, a case where the robot arm 10 is driven in directions to move the tool center point TCP along the X-axis directions and the Y-axis directions is explained.

Furthermore, as shown in FIG. 10, the second operation includes an operation to drive the robot arm 10 to rotate the workpiece W1 about an axis along directions in which the workpiece W1 is inserted into and pulled out of the workpiece W2, i.e., the Z-axis. Thereby, an external force applied to the robot arm 10 when the operation to rotate the workpiece W1 during insertion of the workpiece W1 may be detected.

At step S106, while the above described second operation is performed, the detection results of the force detection unit 19 are stored with respect to each of the above described operations. Thereby, an external force applied to the robot arm 10 may be acquired with respect to each different operation.

Note that, though not shown in the drawings, the robot arm 10 is driven in directions in which the tool center point TCP rotates about the X-axis and the Y-axis, and thereby, an external force is detected.

As described above, in the embodiment, the robot arm 10 is driven to move the tool center point TCP in five directions of a direction along the X-axis, a direction along the Y-axis, a direction of rotation about the X-axis, a direction of rotation about the Y-axis, and a direction of rotation about the Z-axis, and thereby, an external force is detected.

The above described operations are not limited to those in the above described order. Further, in the second operation, not all of the operations shown in FIGS. 8 to 10 are necessarily executed, but at least one of the operations may be executed. Or, the second operation may include an operation in a different direction from the above described directions. For example, an operation in a direction along the Z-axis may be added.

In the second operation, the robot arm 10 is driven by position control. Specifically, the robot arm 10 is driven to move the tool center point TCP to a predetermined distance or a predetermined angle set in advance.

As described above, the second operation is executed by driving of the robot arm 10 by position control. Thereby, an external force applied to the robot arm 10 may be accurately and reliably detected.

Further, the second operation is an operation to move the tool center point TCP as the control point in at least one direction of the insertion direction in which the workpiece W1 as the first object is inserted into the workpiece W2 as the second object, a direction crossing the insertion direction, and a direction of rotation about an axis along the insertion direction. Thereby, magnitude of an external force applied to the robot arm 10 when work is actually performed may be accurately detected. Therefore, as will be described later, external rigidity may be accurately known.

Further, at the second step, an amount of movement of the tool center point TCP as the control point is increased until the detected external force becomes a predetermined value. That is, an upper limit of the external force detected by the force detection unit 19 is set and the second operation of the robot arm 10 is performed until the external force becomes the upper limit. According to the configuration, magnitude of an external force applied to the robot arm 10 may be accurately detected while an excessive load on the workpiece W1 and the workpiece W2 is prevented.

Then, at step S107, information of external rigidity is acquired based on the information of the magnitude of the external force obtained at step S106. At this step, the external rigidity information is acquired using a standard curve or table showing a relationship between external force information and the external rigidity. This table is shown by a function of the amount of movement of the tool center point and the detection value of the force detection unit 19. This standard curve or table is stored in one of the control apparatus 3, the teaching apparatus 4, and an external memory device and experimentally obtained in advance.

The standard curve or table is stored with respect to each direction of the external force and stored with respect to each direction of the second operation. That is, in the embodiment, the standard curve or table is stored with respect to each of the five directions of the direction along the X-axis, the direction along the Y-axis, the direction of rotation about the X-axis, the direction of rotation about the Y-axis, and the direction of rotation about the Z-axis.

Through step S107, the external rigidity information in the five directions may be acquired with respect to each type of the second operation. This step S107 is a third step of acquiring external rigidity information based on the acquired external force information.

Then, at step S108, the force control parameter is acquired. Note that the force control parameter acquired at step S108 is a second force control parameter. At this step, as shown in FIG. 11, the external rigidity information in the five directions, information of the position and the attitude of the robot arm 10 when the force is detected, and a working direction are input to a database. Thereby, the force control parameter may be output and acquired with respect to each of the five directions. Therefore, the force control parameter may be acquired and set with respect to each operation direction. Note that the position of the robot arm 10 refers to the position of the tool center point TCP in the robot coordinate system and the attitude of the robot arm 10 refers to angle information of the respective joints. The database is stored in one of the control apparatus 3, the teaching apparatus 4, and an external memory device.

In the embodiment, the input information input to the database is the external rigidity information, the information of the position and the attitude of the robot arm 10, and the working direction, however, the present disclosure is not limited to that. The force control parameter may be acquired only by input of the external rigidity information and the position of the robot arm 10.

Or, the force control parameters in the translational directions may be the same. That is, the force control parameter for the operation in the X-axis directions, the force control parameter for the operation in the Y-axis directions, and the force control parameter for the operation in the Z-axis directions may be set to the same.

Or, the force control parameters in the rotational directions may be the same. That is, the force control parameter for the rotation about the X-axis directions, the force control parameter for the rotation about the Y-axis directions, and the force control parameter for the rotation about the Z-axis directions may be set to the same.

As described above, the force control parameters are the same with respect to each direction, and thereby, processing for setting the force control parameters may be simplified.

Or, all of the mass coefficient m, the viscosity coefficient d, and the elastic coefficient k may be set to the same numerical value. In this case, the processing for setting the force control parameters may be further simplified.

Or, the settings may be made by a combination of the above described patterns.

Then, at step S109, the workpiece W1 is pulled out from the workpiece W2, and, at step S110, the tool center point TCP is returned to the start position. Then, at step S111, an insertion completion position is detected. That is, when the second operation is executed, a position where the tool center point TCP moves is detected and stored. Then, the detection value is used as a target position for the next second operation. Thereby, the second and subsequent second operations may be promptly and accurately performed.

Then, at step S112, whether or not the acquisition of the force control parameter is the second time is determined. When not the second time, i.e., the first time is determined, the process returns to step S103 and the subsequent steps are repeated. Note that the second time is determined, the process moves to step S113.

At step S113, the force control parameter acquired at the first time and the force control parameter acquired at the second time are compared and whether or not a difference is within a predetermined range set in advance is determined. At this step, the force control parameters are compared between the first time and the second time with respect to each direction of the second operation and, when the differences between the respective force control parameters are within the predetermined range, at step S114, the force control parameter at the first time or the second time compared at step S113 is set as the force control parameter when work is actually performed.

Note that, at step S113, when the difference is out of the predetermined range set in advance, that is, when the difference is larger, the process returns to step S103 and the external rigidity is remeasured as the first measurement.

As described above, when the force control parameter is measured twice and the difference is within the predetermined range, the force control parameter is employed, and thereby, the force control parameter may be set more accurately.

This step S114 is a fourth step of setting the second force control parameter acquired based on the acquired external rigidity information and the position of the tool center point TCP corresponding to the acquired external rigidity information as the force control parameter.

As described above, the method of adjusting the force control parameter according to the present disclosure is the method of adjusting the force control parameter of adjusting the force control parameter of the robot 1 having the robot arm 10 driven by force control and performing work to insert the workpiece W1 as the first object into the workpiece W2 of the second object. Further, the method of adjusting the force control parameter according to the present disclosure includes the first step of executing the first operation to bring the end effector 20 as the hand placed on the robot arm 10 or the workpiece W1 held by the end effector 20 into contact with the workpiece W2 based on the first force control parameter, the second step of acquiring the information of the external force applied to the robot arm 10 by executing the second operation different from the first operation with the end effector 20 or the workpiece W1 in contact with the workpiece W2, the third step of acquiring the information of the external rigidity based on the acquired external force information, and the fourth step of changing the force control parameter from the first force control parameter to the second force control parameter acquired based on the acquired external rigidity information and the position of the tool center point TCP corresponding to the acquired external rigidity information. Thereby, the force control parameter may be easily and accurately set in consideration of the external rigidity.

The force control parameter adjustment program according to the present disclosure is the force control parameter adjustment program for adjusting the force control parameter of the robot 1 having the robot arm 10 driven by force control and performing work to insert the workpiece W1 as the first object into the workpiece W2 of the second object. Further, the force control parameter adjustment program according to the present disclosure is for executing the first step of executing the first operation to bring the end effector 20 as the hand placed on the robot arm 10 or the workpiece W1 held by the end effector 20 into contact with the workpiece W2 based on the first force control parameter, the second step of acquiring the information of the external force applied to the robot arm 10 by executing the second operation different from the first operation with the end effector 20 or the workpiece W1 in contact with the workpiece W2, the third step of acquiring the information of the external rigidity based on the acquired external force information, and the fourth step of setting the second force control parameter acquired based on the acquired external rigidity information and the position of the tool center point TCP corresponding to the acquired external rigidity information as the force control parameter. Thereby, the force control parameter may be easily and accurately set in consideration of the external rigidity.

Note that the force control parameter adjustment program according to the present disclosure may be stored in a memory unit of the control apparatus 3 or the teaching apparatus 4, stored in a recording medium e.g. a CD-ROM or the like, or stored in a memory device that can be connected via a network or the like.

The robot system 100 according to the present disclosure includes the robot 1 having the robot arm 10 driven by force control and performing work, the force detection unit 19 detecting the force applied to the robot arm 10, and the control apparatus 3 or the teaching apparatus 4 as the control unit controlling actuation of the robot 1. Further, the control apparatus 3 or the teaching apparatus 4 executes the first operation to bring the end effector 20 as the hand placed on the robot arm 10 or the workpiece W1 held by the end effector 20 into contact with the workpiece W2 based on the first force control parameter, acquires the information of the external force applied to the robot arm 10 by executing the second operation different from the first operation with the end effector 20 or the workpiece W1 in contact with the workpiece W2, acquires the information of the external rigidity based on the acquired external force information, and performs control to set the second force control parameter acquired based on the acquired external rigidity information and the position of the tool center point TCP corresponding to the acquired external rigidity information as the force control parameter. Thereby, the force control parameter may be easily and accurately set in consideration of the external rigidity.

The force detection unit 19 is used when the robot arm 10 is driven by force control. That is, the force detection unit 19 serves as both a force detection unit that detects an external force while the second operation is performed and a force detection unit that detects an external force when force control is performed. Thereby, the apparatus configuration may be simplified and the control may be simplified.

Other Configuration Examples of Robot System

Figure 12:
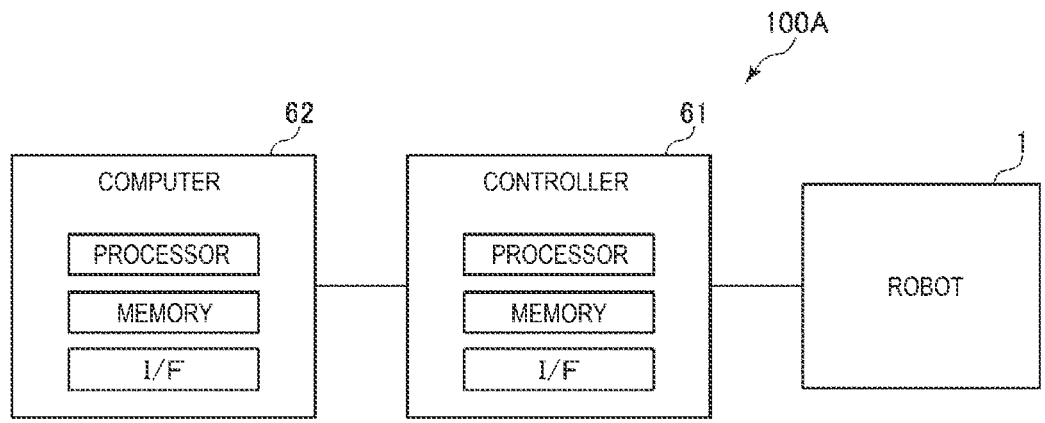
FIG. 12 is a block diagram for explanation of the robot system with a focus on hardware.

FIG. 12 is a block diagram for explanation of the robot system with a focus on hardware.

FIG. 12 shows an overall configuration of a robot system 100A in which the robot 1, a controller 61, and a computer 62 are coupled. The control of the robot 1 may be executed by reading of a command in a memory using a processor in the controller 61 or executed by reading of a command in a memory using a processor in the computer 62 via the controller 61.

Therefore, one or both of the controller 61 and the computer 62 may be regarded as "control apparatus".

Modified Example 1

Figure 13:
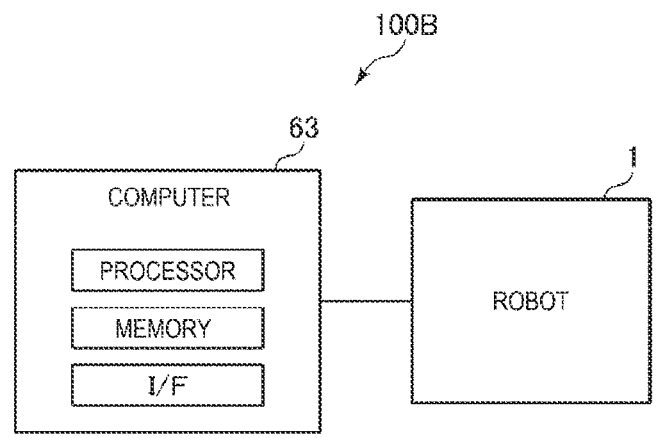
FIG. 13 is a block diagram showing modified example 1 of the robot system with a focus on hardware.

FIG. 13 is a block diagram showing modified example 1 of the robot system with a focus on hardware.

FIG. 13 shows an overall configuration of a robot system 100B in which a computer 63 is directly coupled to the robot 1. The control of the robot 1 is directly executed by reading of a command in a memory using a processor in the computer 63.

Therefore, the computer 63 may be regarded as "control apparatus".

Modified Example 2

Figure 14:
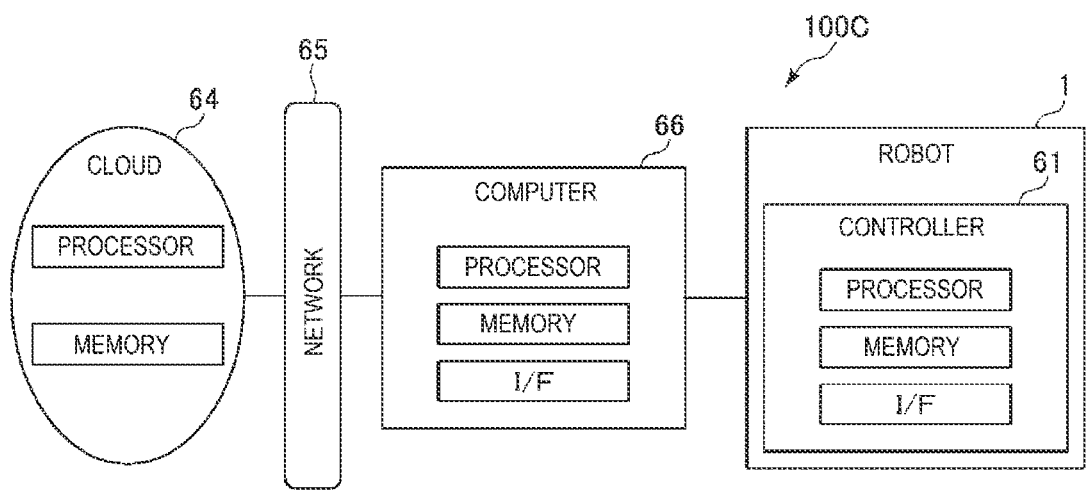
FIG. 14 is a block diagram showing modified example 2 of the robot system with a focus on hardware.

FIG. 14 is a block diagram showing modified example 2 of the robot system with a focus on hardware.

FIG. 14 shows an overall configuration of a robot system 100C in which the robot 1 containing the controller and a computer 66 are coupled and the computer 66 is coupled to a cloud 64 via a network 65 such as a LAN. The control of the robot 1 may be executed by reading of a command in a memory using a processor in the computer 66, or executed by reading of a command in a memory via the computer 66 using a processor on the cloud 64.

Therefore, one, two, or three of the controller 61, the computer 66, and the cloud 64 may be regarded as "control apparatus".

As above, the method of adjusting the force control parameter, the robot system, and the force control parameter adjustment program according to the present disclosure are explained with respect to the illustrated embodiments, however, the present disclosure is not limited to the embodiments. The respective parts forming the robot system may be replaced by arbitrary configurations that may exert the same functions. Further, an arbitrary configuration may be added thereto.

What is claimed is:

1. A method for causing a processor to execute a process, the method comprising executing on the processor the steps of:

executing a first operation to bring a first object held by a hand of a robot arm of a robot into contact with a second object based on a first force control parameter for a force sensor, a tool center point being set on the hand;

detecting a contact state between the first object and the second object;

detecting a first position of the tool center point when the processor detects the contact state;

acquiring an external force value applied to the robot arm by executing a second operation different from the first operation on the robot with the hand, the first object being further pushed toward the second object while the first and second objects are in the contact state in the second operation;

detecting a second position of the tool center point when the processor ends the second operation;

acquiring information of external rigidity based on a function of the acquired external force value and a movement amount of the tool center point between the first and second positions; and changing the first force control parameter to a second force control parameter based on the acquired information of the external rigidity, wherein the second operation includes an operation to drive the robot arm to move the first object in first directions crossing second directions along which the first object is inserted into and pulled out from the second object.

2. The method according to claim 1, wherein an element determining the external rigidity includes information of an element belonging to the robot arm, information of an element belonging to the hand, information of an element belonging to the first object, and information of an element belonging to the second object.

3. The method according to claim 1, wherein the second operation is executed by driving of the robot arm by position control.

4. The method according to claim 1, wherein in the second operation, the tool center point is moved in at least one direction of an insertion direction in which the first object is inserted into the second object, a direction crossing the insertion direction, and a rotation direction rotating about an axis along the insertion direction.

5. The method according to claim 1, wherein in the acquiring of the external force value, the movement amount of the tool center point is increased until the detected external force value reaches a predetermined value.

6. The method according to claim 1, wherein the second force control parameter is further adjusted based on information of a type of the hand and information of a type of the first object.

7. A robot system comprising:

a robot having a robot arm driven by force control and performing work;

a force sensor configured to detect a force applied to the robot arm;

a memory configured to store a program; and a processor configured to execute the program so as to:
  perform a first operation to bring a first object held by a hand of the robot arm into contact with a second object based on a first force control parameter for the force sensor, a tool center point being set on the hand;
  detect a contact state between the first object and the second object;
  detect a first position of the tool center point when the processor detects the contact state;
  acquire an external force value of the force applied to the robot arm by executing a second operation different from the first operation on the robot with the hand, the first object being further pushed toward the second object while the first and second objects are in the contact state in the second operation;
  detect a second position of the tool center point when the processor ends the second operation;
  acquire information of external rigidity based on a function of the acquired external force value and a movement amount of the tool center point between the first and second positions; and
  change the first force control parameter to a second force control parameter based on the acquired information of the external rigidity, wherein the second operation includes an operation to drive the robot arm to move the first object in first directions crossing second directions along which the first object is inserted into and pulled out from the second object.

8. The robot system according to claim 7, wherein the force sensor is configured to detect the force when the robot arm is driven by the force control.

9. A non-transitory computer-readable storage medium storing a force control parameter adjustment program for causing a computer to execute a process by a processor so as to perform the steps of:

executing a first operation to bring a first object held by a hand of a robot arm of a robot into contact with a second object based on a first force control parameter for a force sensor, a tool center point being set on the hand;

detecting a contact state between the first object and the second object;

detecting a first position of the tool center point when the processor detects the contact state;

acquiring an external force value applied to the robot arm by executing a second operation different from the first operation on the robot with the hand, the first object being further pushed toward the second object while the first and second objects are in the contact state in the second operation;

detecting a second position of the tool center point when the processor ends the second operation;

acquiring information of external rigidity based on a function of the acquired external force value and a movement amount of the tool center point between the first and second positions; and changing the first force control parameter to a second force control parameter based on the acquired information of the external rigidity, wherein the second operation includes an operation to drive the robot arm to move the first object in first directions crossing second directions along which the first object is inserted into and pulled out from the second object.

* * * * *